(12) United States Patent
Kopp et al.

(10) Patent No.: US 6,671,293 B2
(45) Date of Patent: Dec. 30, 2003

(54) CHIRAL FIBER LASER APPARATUS AND METHOD

(75) Inventors: Victor Il'ich Kopp, Flushing, NY (US); Azriel Zelig Genack, New York, NY (US)

(73) Assignee: Chiral Photonics, Inc., Clifton, NJ (US)

( * ) Notice: Subject to any disclaimer, the term of this patent is extended or adjusted under 35 U.S.C. 154(b) by 0 days.

(21) Appl. No.: 10/299,651

(22) Filed: Nov. 19, 2002

(65) Prior Publication Data

US 2003/0095578 A1 May 22, 2003

Related U.S. Application Data

(60) Provisional application No. 60/333,071, filed on Nov. 19, 2001.

(51) Int. Cl.[7] .................................................. H01S 3/30
(52) U.S. Cl. ................... 372/6; 372/39; 372/72
(58) Field of Search ...................... 372/6, 39, 72

(56) References Cited

U.S. PATENT DOCUMENTS 5,361,320 A * 11/1994 Liu et al. .................... 385/143
6,154,591 A * 11/2000 Kershaw ...................... 385/39
6,301,421 B1 * 10/2001 Wickham et al. ............... 372/6
6,396,859 B1 * 5/2002 Kopp et al. .................. 372/39
6,411,635 B1 * 6/2002 Kopp et al. .................. 372/39
6,422,043 B1 * 7/2002 DiGiovanni et al. .......... 65/402
6,529,676 B2 * 3/2003 Eggleton et al. ............. 385/142

* cited by examiner

*Primary Examiner*—Quyen Leung
*Assistant Examiner*—Cornelius H Jackson
(74) *Attorney, Agent, or Firm*—Edward Etkin, Esq.

(57) ABSTRACT

A chiral fiber laser implemented in a fiber Bragg grating mimicking the advantageous optical properties of a cholesteric liquid crystal structure is provided. The dopant, the pitch, the core cross section and dimensions thereof, of the inventive chiral fiber laser as well as the core and cladding materials used in construction thereof, may be advantageously selected and configured to enable the inventive chiral fiber laser to produce lasing at a desirable wavelength. In another embodiment of the inventive chiral fiber laser, a tunable defect is introduced to provide tunable lasing corresponding to the wavelength at the defect mode. Multiple embodiments using coupled fiber optical pumping as well as direct optical pumping for excitation of the inventive chiral fiber laser are provided.

17 Claims, 5 Drawing Sheets

CHIRAL FIBER LASER APPARATUS AND METHOD

CROSS REFERENCE TO RELATED APPLICATIONS

The present patent application claims priority from the commonly assigned U.S. provisional patent application Serial No. 60/333,071 entitled "Chiral Fiber Laser Apparatus And Method" filed Nov. 19, 2001.

FIELD OF THE INVENTION

The present invention relates generally to lasers based on chiral structures, and more particularly to optically pumped lasers utilizing chiral fiber elements.

BACKGROUND OF THE INVENTION

Semiconductor lasers have found many industrial and commercial applications in recent years. For example lasers are used in telecommunications, in optically readable media pickups that are used in CD players, CD ROM drives and DVD players, in medical imaging, and in video displays. However, previously known semiconductor lasers have a number of disadvantages. For example, traditional semiconductor lasers, such as ones used in CD players, emit light from the edge of a chip, so it is necessary to cleave a wafer into chips and package the chip before knowing if the laser functions properly. Other types of light sources, such as LEDs do not provide the performance needed for certain applications.

Vertical Cavity Surface Emitted Lasers (hereinafter "VCSELs") have been developed to address the need for a more advanced, higher quality laser that can function well in a variety of applications. VCSELs combine the performance advantages of LEDs and edge-emitting lasers at costs comparable to LED solutions. VCSELs emit light vertically from the wafer surface, like LEDs, which means their fabrication and testing is fully compatible with standard I.C. procedures and equipment, and also means that arrays of VCSELs are feasible. Additionally, VCSELs are much faster, more efficient, and produce a smaller divergence beam than LEDs.

The VCSEL structure leads to a host of performance advantages over conventional semiconductor lasers.

1) small size
2) low power consumption
3) two-dimensional array capabilities

In contrast to conventional edge-emitting semiconductor lasers, the surface-emitting VCSEL has a radially symmetric Gaussian near-field, greatly simplifying coupling to optical elements or fibers. In addition, VCSEL technology allows the fabrication of two-dimensional laser arrays.

However, VCSELS suffer from a number of disadvantages. The manufacture of VCSELs requires sophisticated and expensive mircofabrication. Since single-pass gain in thin layer semiconductor lasers is low, VCSELs incorporate highly reflective dielectric stacks which are integrated into the laser as Bragg reflectors. These consist of alternating layers of dielectric material, which are grown using methods of molecular beam epitaxy (MBE). This ensures a close match of the atomic lattice structures of adjacent layers. Alternating atomically ordered layers of materials with different electronic characteristics are thereby produced. The interfaces between the layers must be digitally graded and doped to reduce the electrical resistance.

Much work has been done to improve the performance of VCSELs by increasing the number of layers and/or the dielectric difference between alternating layers. However, this approach makes the fabrication more expensive and difficult. There is also a limit to the number of layers determined by absorption in these layers. While VCSELs can be manufactured in two-dimensional arrays, there has been great difficulty in achieving uniform structure over large areas and in producing large area arrays. The materials typically used for VCSELs do not have the desired low absorption and high index contrast over a the frequency range of interest in telecommunications. In particular, it is difficult to achieve high reflectivity in the communication band around 1.5 microns.

In addition, VCSELs cannot be tuned in frequency since their periods cannot be changed. The density of photon modes is not changed appreciably by use of a low index contrast multilayer Bragg reflector and the gain cannot be improved in a VCSEL system as compared to that in an ordinary laser cavity. Also, an external device must be used to control the polarization of the light.

A number of novel solutions have recently been developed to address the drawbacks of VCSEL-based lasers. These new techniques advantageously utilize certain chiral materials, such as cholesteric liquid crystals, to achieve high efficiency, low threshold lasers. All of these solutions are based on utilizing the photonic band gap phenomenon that occurs in periodic structures.

For example, the commonly assigned co-pending U.S. patent application entitled "Stop Band Laser Apparatus and Method", discloses a novel band gap laser with increased output power and low lasing threshold with improved control over the spatial, spectral, and temporal lasing parameters. A commonly assigned U.S. Pat. No. 6,404,789 entitled "Chiral Laser Apparatus and Method" discloses a variety of electrically and optically pumped chiral lasers based on cholesteric liquid crystal (CLC) structures. The CLC lasers disclosed in this patent application advantageously overcame the drawbacks of previously known edge-emitting lasers and VCSELs due to unique properties of chiral (cholesteric) materials. Specifically, the disadvantages of the prior art were overcome as follows:

1) In contrast to multi-layered structures, such as VCSELs, that are difficult to produce, the CLC films/layers are self-organized structures that are readily fabricated;
2) The period of a CLC film/layer could be readily changed by applying an electric or magnetic field or changing temperature or pressure so that the laser output could be tuned in frequency within the gain band of the light-emitting middle layer;
3) The band structure of a CLC film/layer leads to an increase in the local density of photon modes over a narrow wavelength range. This in turn results in an improvement in gain and to a reduction of the lasing threshold; and
4) The polarization of the laser output is determined by the CLC structure. Thus the laser beam is right or left circularly or linearly polarized without requiring any external device.

Another commonly assigned U.S. Pat. No. 6,411,635 entitled "Method of Mode Selection in a Photonic Band Edge Laser", further improves the previously described commonly assigned patents by disclosing an apparatus and method for advantageously enabling single-mode lasing at higher pump power, for reducing the bandwidth of the lasing radiation, and for enabling advantageous selection of a particular photonic mode for lasing at that mode in a periodic laser.

The previously described patents and co-pending application also disclosed that a defect may be introduced into a periodic structure causing lasing to advantageously occur at a wavelength corresponding to a localized defect photonic state within the photonic stop band. This leads to enhanced energy density within the periodic structure. However, it is difficult to construct a layered structure with a precise light emitting material thickness required to produce a defect (the required thickness must be equal to the wavelength of light in the medium divided by 4). More importantly, the position of the localized state caused by the defect cannot be easily controlled because the thickness of the light-emitting material cannot be changed once the device is manufactured. To address this challenge, a commonly assigned U.S. Pat. No. 6,396,859 entitled "Chiral Twist Laser and Filter Apparatus and Method", which is hereby incorporated by reference in its entirety, introduced a novel apparatus and method for inducing a variable (i.e. tunable) defect into a chiral structure.

The essence of the inventive techniques disclosed in the above-described commonly assigned co-pending patent applications relies on utilization of properties of one-dimensional periodic structures. There are two previously known types of one-dimensional (1D) photonic band gap (PBG) structures: (1) periodic layered media and (2) cholesteric liquid crystals (CLCs). In both of these systems the wavelength inside the medium at the center of the band gap is twice the period of the structure in question. In CLC structures, the band gap exists only for the circular polarized component of light, which has the same sense of rotation as the structure. The second circular component is unaffected by the structure. The first type of structure has been implemented in optical fibers and is known as a fiber Bragg grating (FBG). However, the second type of structures —CLCs—does not exist in form of fibers. Fiber Bragg gratings have many applications—fiber components form the backbone of modern information and communications technologies and are suitable for a wide range of applications—for example in information processing. However, FBGs based on conventional periodic structures are not easy to manufacture and suffer from a number of disadvantages.

Because CLCs exhibit superior properties in comparison to layered media (as disclosed in above-incorporated U.S. patent entitled "Chiral Laser Apparatus and Method"), new techniques were developed to implement the advantageous optical properties of a cholesteric periodic photonic band gap (hereinafter "PBG") structure in an optical fiber which is easier to fabricate. These novel techniques for implementing CLC-like PBG structures in optical fibers and/or for fabricating such fibers are disclosed in commonly assigned co-pending U.S. Patent applications entitled "Apparatus and Method for Manufacturing Fiber Gratings", "Apparatus and Method of Manufacturing Helical Fiber Bragg Gratings", "Apparatus and Method for Fabricating Helical Fiber Bragg Gratings", and "Helical Fiber Bragg Grating" which are all hereby incorporated by reference in their entirety. These approaches captured the superior optical properties of cholesteric liquid crystals while facilitating the manufacture of the structure as a continuous (and thus easier to implement) process.

As previously described, lasers based on CLC-like chiral structures offer significant advantages over previously known periodic lasers. However, there are a number of challenges in fabricating CLC structures suitable for use in lasers. Conversely, FBG structures offer advantages in relatively simple and easy to reproduce FBG fabrication process. Utilizing the above-described techniques for fabricating FBGs with CLC-like optical properties it would be desirable to provide a chiral fiber laser that combines the advantages of chiral (e.g. CLC) and FBG structures. It would further be desirable to provide a chiral fiber laser that may be configured and fabricated for use at a specific desired wavelength. It would also be desirable to provide a chiral fiber laser having a dynamically tunable lasing wavelength.

SUMMARY OF THE INVENTION

The present invention is directed to a novel chiral fiber laser that is based on a specially configured optical fiber structure having advantageous optical properties similar to a cholesteric liquid crystal (CLC) structure. The optical fiber structure used in the inventive chiral fiber laser achieves optical properties similar to a CLC structure because it satisfies the requirement that in a CLC structure the pitch of the structure is twice its period. This is accomplished by using a chiral fiber structure having geometric birefringence with 180 degree symmetry. Such properties may be obtained by imposing two identical coaxial helixes along a fiber structure, where the second helix is shifted by half of the structure's pitch forward from the first helix. Such structures are described in greater detail in the above-incorporated U.S. Patent applications entitled "Apparatus and Method for Manufacturing Fiber Gratings", "Apparatus and Method of Manufacturing Helical Fiber Bragg Gratings", "Apparatus and Method for Fabricating Helical Fiber Bragg Gratings", and "Helical Fiber Bragg Grating". Several embodiments of the inventive chiral fiber laser are discussed below.

The first embodiment of an exemplary chiral fiber laser, includes a fiber structure doped with an active material, such as Erbium, and an optical electromagnetic energy source directed at the fiber structure for exciting the active material. The fiber structure comprises a core, having 180 degree cross-sectional symmetry, and a cladding surrounding the core. Both the core and the cladding may be composed from a variety of optical materials (e.g. glass) selected as a matter of design choice. The dopant material may be introduced into the core, the cladding or into both components of the fiber structure. Most importantly, the fiber structure is configured to satisfy the requirement that the pitch of the structure is twice the period—i.e. by imposing two identical coaxial helixes along the fiber structure, where the second helix is shifted by half of the structure's pitch forward from the first helix. In the first exemplary embodiment of the inventive chiral fiber laser, this is accomplished by twisting the core to form a double helix structure. It should be noted that other techniques disclosed in the above-incorporated patent applications may be utilized to accomplish the same objectives. The optical pump may pump in a core mode directly, or it may pump in a cladding mode to ensure more homogenous absorption.

To provide the inventive chiral fiber laser that produces lasing at a desired wavelength, the fiber structure of the laser must be properly configured prior to twisting. The configuration process involves selection of configuration parameters: core and cladding materials, the cross-section shape and dimensions of the core, and the desired lasing mode (band edge mode or defect mode). Given the value of the desired lasing wavelength and values of the above configuration parameters, the desired pitch of the fiber structure may be readily obtained. Together with the selection of the configuration parameters and determination of the pitch, the fiber structure that will enable the inventive chiral fiber laser to produce lasing at the desired wavelength may be readily fabricated. By changing the pitch of the fiber structure after fabrication (i.e. by twisting the structure, pulling it, or by changing its temperature) the lasing wavelength may be readily tuned, thus providing a tunable chiral fiber laser.

Other embodiments of the inventive chiral fiber laser include fiber structures with a defect introduced therein to enable lasing at a defect mode, One embodiment includes a twist defect that facilitates tuning of the lasing wavelength by twisting two portions of the fiber structure with respect to one another. Several optical pumping embodiments include coupled pumping from a single coupled pumped optical fiber, pumping of multiple chiral fiber laser from a single coupled pumped optical fiber, and pumping of a single chiral fiber laser from multiple coupled pumped optical fibers.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The present invention is directed to an advantageous chiral fiber laser that embodies the advantages of cholesteric liquid crystals (CLCs) in a simplified easy-to-use fiber form.

Presently used fiber Bragg gratings may be seen as analogous to 1D layered dielectric media. CLCs are a superior form of 1D periodic structures. Because CLCs exhibit superior properties in comparison to layered media (as disclosed in the above-incorporated U.S. patent applications), the above-incorporated U.S. Patent Application entitled "Helical Fiber Bragg Grating" (hereinafter "HFBG")) disclosed the advantageous implementation of the essence of a cholesteric periodic photonic band gap (hereinafter "PBG") structure in an optical fiber. This novel approach captured the superior optical properties of cholesteric liquid crystals while facilitating the manufacture of the structure as a continuous (and thus easier to implement) process.

In order to accomplish this, The HFBG patent application taught that the inventive structure must mimic the essence of a conventional CLC structure—its longitudinal symmetry. A helical fiber structure appears to have the desired properties. However, in a CLC structure the pitch is twice the period. This is distinct from the simplest realization of the helical structure, which is a single helix. In the single helix structure, the period is equal to the pitch and one might expect to find the band gap centered at the wavelength equal to twice the pitch. However, this arrangement produces a mismatch between the orientation of the electric field of light passing through the structure and the symmetry of the helix. The field becomes rotated by 360 degrees at a distance equal to the wavelength of light of twice the pitch. On the other hand, the helix rotation in this distance is 720 degrees. Thus, while a helical structure has certain beneficial applications it does not truly mimic the desirable CLC structure with one notable exception—when the structure is composed of two different adjacent materials.

Thus, a structure that meets the requirements for producing a photonic stop band while preserving the advantages of a cholesteric structure must satisfy two requirements:

(1) that the period of the structure's optical dielectric susceptibility is half the wavelength, and (2) the dielectric susceptibility of the structure rotates so that it is always aligned with the direction of the field of the circular polarized standing wave.

The HFBG patent application further taught that one of the most advantageous and simplest ways to construct a structure satisfying these requirements is to create a double helix structure. In this structure, two identical coaxial helixes are imposed in or on a fiber structure, where the second helix is shifted by half of the pitch forward from the first helix. Another advantageous structure satisfying these requirements is a single helix structure that is composed of two adjacent components of different optical indexes joined together. In this case the wavelength is equal to the pitch and the pitch is equal to twice the period of the effective optical dielectric susceptibility of the system. The HFBG patent application disclosed several embodiments of such advantageous double and single helix structures in optical fibers that may be fabricated as a matter of design choice. An advantageous apparatus and a method for fabricating double and single helix structures are disclosed in the above-incorporated commonly assigned co-pending provisional patent application entitled "Apparatus and Method for Manufacturing Helical Fiber Bragg Gratings".

While the chiral fiber laser of the present invention is described with reference to the above-incorporated embodiments of inventive optical fibers having CLC-like properties derived from their helical or double helical structures (for example, a twisted fiber having a core cross-section shown in FIG. 1B), it should be noted that the inventive chiral laser may be advantageously constructed utilizing any optical fiber having CLC-like properties (i.e. a photonic stop band) regardless of how those properties are achieved. For example, instead of using a fiber structure having a twisted core, the core may have double helix groove patterns inscribed thereon, or wrapped in a double helix pattern with another dielectric material or a combination of the two (these and other techniques for producing the desired CLC-like properties in optical fibers are described in greater detail in the HFBG patent application). Furthermore, it should be noted that the various advantageous CLC-related techniques disclosed in the above-incorporated commonly assigned co-pending U.S. Patent Applications may be readily adapted to and advantageously utilized in conjunction with the inventive chiral fiber laser as a matter of design choice.

Figure 1A:
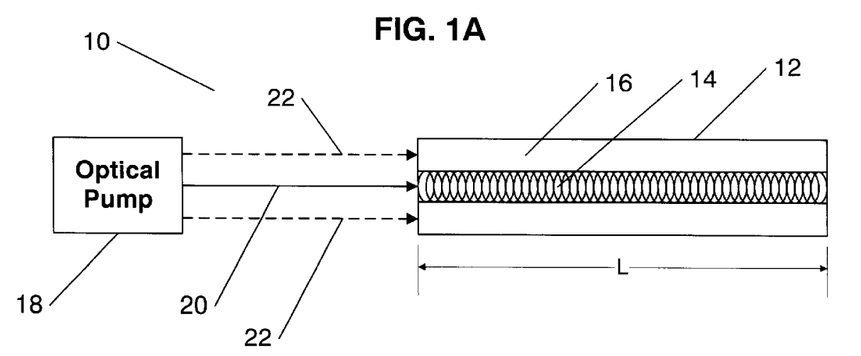
FIG. 1A is a schematic diagram of a side view of a first embodiment of the chiral fiber laser of the present invention.
Figure 1B:
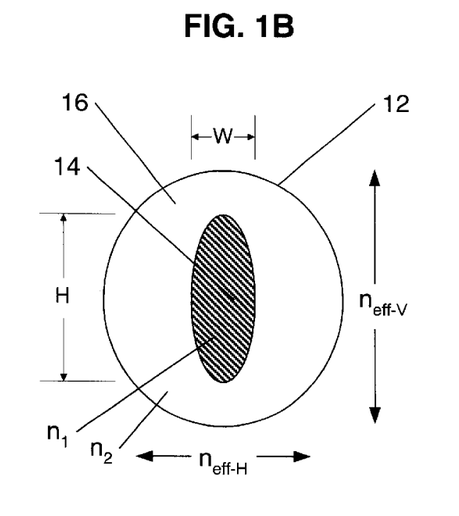
FIG. 1B is a schematic diagram of a cross-section view of fiber structure of the chiral fiber laser of FIG. 1.

Referring now to FIGS. 1A and 1B, a first embodiment of an exemplary chiral fiber laser 10 that produces lasing an a predefined desired wavelength $\lambda_L$ is shown. The laser 10 includes a fiber structure 12 and an optical pump 18 (or similar electromagnetic energy source). The fiber structure 12 comprises a core 14 and a cladding 16 surrounding the core 14. Both the core 14 and the cladding 16 may be composed from a variety of optical materials (e.g. glass) selected as a matter of design choice. The structure 12 may also optionally comprise a defect as described below in connection with FIGS. 3A–3C. The presence of a defect enables lasing at a defect mode rather than at a band edge mode.

While there are many physical parameters which may be considered in selecting core and cladding materials (i.e. cost, flexibility, temperature response, etc.) for the purposes of configuring the fiber laser 10, the key factors in material selection are the refractive indices of the core 14 and cladding 16 materials—$n_1$ and $n_2$ respectively, and the difference between these indices. The magnitude of the difference between $n_1$ and $n_2$ is important in determining whether the fiber laser 10 will be optimized for low threshold, low power lasing or for high threshold, high power lasing. Increasing the difference between $n_1$ and $n_2$ increases optimization of the fiber laser 10 for low threshold, low power lasing, while decreasing the difference between $n_1$ and $n_2$ increases optimization of the fiber laser 10 for high threshold, high power lasing. It should be noted, however, that the difference between $n_1$ and $n_2$ is not the sole determining factor in the fiber laser 10 lasing characteristics—however, determination of the magnitude of the difference is important for optimization of the desired lasing characteristics with respect to lasing threshold and power.

While an elongated oval core 14 cross section is shown in FIG. 1B, the specific cross-section and dimensions of the core 14 may be selected as a matter of design choice, as long as the core structure maintains 180 degree cross-sectional symmetry, such that when it is twisted, a double helix structure is formed. Thus the core 14 may have a rectangular cross-section or a generally rectangular cross section with parallel sides but with semicircular top and bottom portions.

In order for the fiber laser 10 to produce lasing at the desired lasing wavelength, the fiber structure 12 must be a double helix structure with a specific pitch P. The fiber structure 12 can be configured as a double helix structure by twisting the core. As noted above, other means for achieving a double helix core structure may be readily utilized without departing from the spirit of the invention—the twisting of the core 14 is shown and described by way of example only. However, the specific pitch P that corresponds to the desired lasing wavelength $\lambda_L$, must be determined individually for each fiber structure 12 because the value of P is based on the core and cladding refractive indices, $n_1$ and $n_2$, respectively, the core cross-section shape and dimensions (length L, height H, and width W) as well as on the desired lasing mode (band edge or defect). There a number of well known techniques for obtaining P given the above-described parameters, for example by software simulation, by the FDTD (Finite Difference Time Domain), by the Beam Propagation Method, by microwave modeling, analytically or by experimentation. Software modeling is advantageous because it enables determination of other parameters given desired values of P and $\lambda_L$. For example, given P and $\lambda_L$, one can determine the necessary core dimensions L, H, W or the necessary refractive indices $n_1$ and $n_2$.

Given the selected core and cladding materials, the core cross-section shape and dimensions, the presence or lack of a defect in the fiber structure 12, and the pitch P, the fiber structure 12 can be configured and fabricated such that the fiber laser 10 utilizing this fiber structure 12 advantageously produces lasing at the desired wavelength $\lambda_L$. The above-incorporated patent application entitled "Apparatus and Method for Manufacturing Helical Fiber Bragg Gratings" shows and describes a novel apparatus and method for configuring and fabricating the fiber structure 12.

Advantageously, the value of the obtained pitch P is directly proportional to the value of $\lambda_L$. Thus, if, for example, the value of $\lambda_L$ needs to be adjusted by 10%, the value of P can simply be adjusted by 10% to ensure that the fiber laser 10 will provide lasing at the new value of $\lambda_L$. This relationship between P and $\lambda_L$ can be advantageously utilized to enable tuning of the fiber laser 10 by changing the pitch P of the fiber structure 12. This may be done by twisting the fiber structure 12 around its longitudinal axis, by changing its temperature, or by compressing or stretching it.

An exemplary process for configuring the fiber structure 12 is shown and described below in connection with FIG. 6

Figure 4:
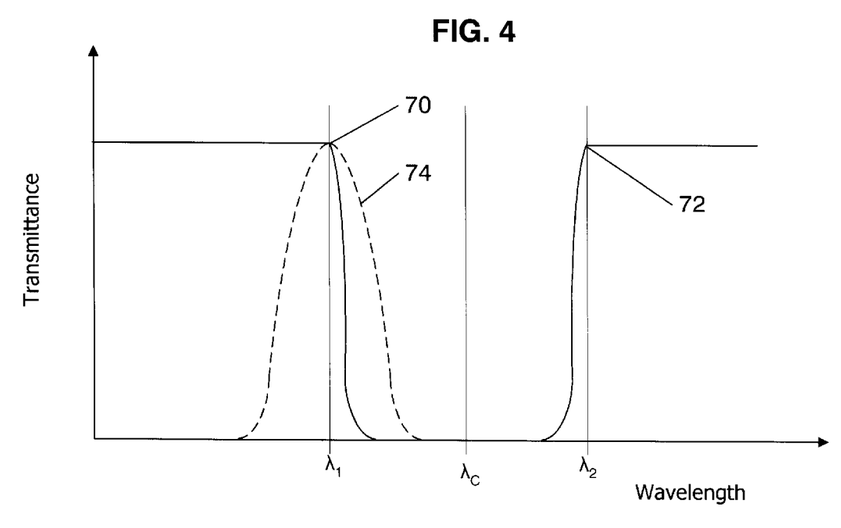
FIG. 4 is a diagram of transmittance versus wavelength, for the first embodiment of the inventive chiral fiber laser of FIG. 1, showing the photonic band gap and the photonic band edge modes, as well as the emission spectrum of the active material used in the inventive chiral fiber laser.

Returning now to FIGS. 1A and 1B, the optical pump 18 may provide core pumping 20 in a core mode, or cladding pumping 22 in a cladding mode to maximize homogeneous absorption by the active material in the fiber structure 12. Preferably, at least one of the core 14 and cladding 16 are doped with an active material, such as Erbium, that emits electromagnetic radiation in response to optical pumping from the optical pump 18. Preferably, the active emitting material is selected in accordance with the present invention so that the peak of an emission spectrum of the emitting material lies substantially near the desired wavelength $\lambda_L$. Referring now to FIG. 4, an exemplary transmittance vs. wavelength graph shows a simplified representation of the FBG of the fiber structure 12 showing band edge modes 70, 72 corresponding to wavelengths $\lambda_1$ and $\lambda_2$, as well as the emission spectrum 74 having its emission peak substantially proximal to one of the band edge modes (in this example mode 70). The example of FIG. 4 assumes that lasing is desired at wavelength $\lambda_L$ equal to $\lambda_1$. This near coincidence of the peak of the desirable band edge mode 70 and of the emission peak of the emitting material produces optimized energy distribution within the fiber laser 10 and thus results in high efficiency lasing at the desired lasing wavelength $\lambda_L$.

Figure 2A:
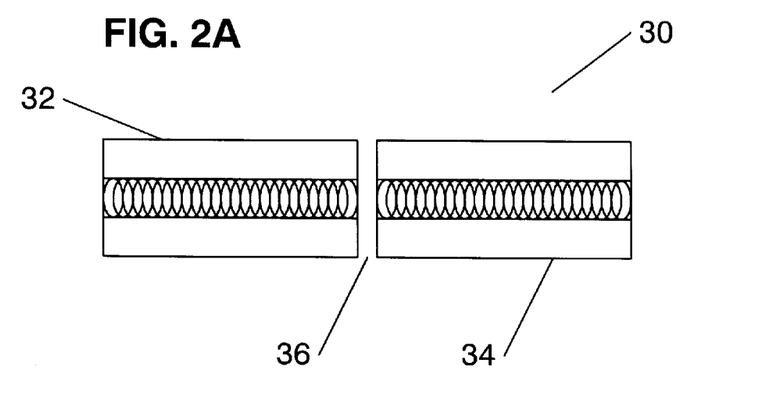
FIGS. 2A–2C are schematic diagrams of alternate embodiments of the chiral fiber laser of FIG. 1 utilizing a defect introduced into the fiber structure.
Figure 2B:
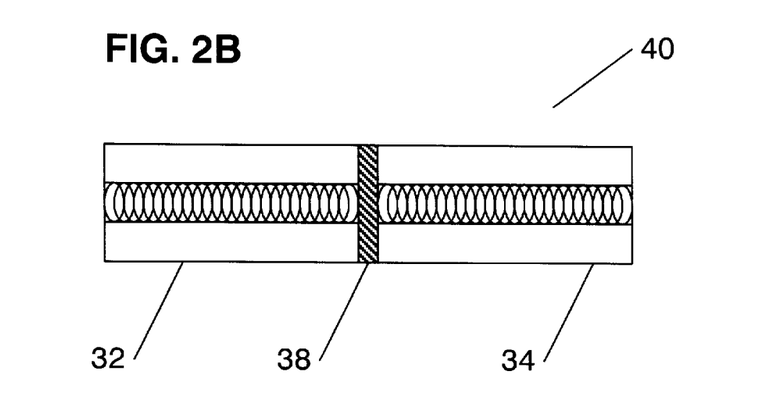
Figure 2C:
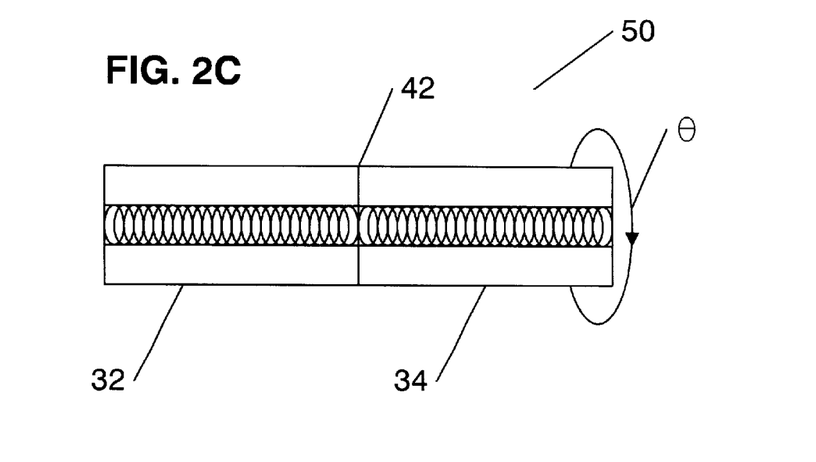
Figure 5:
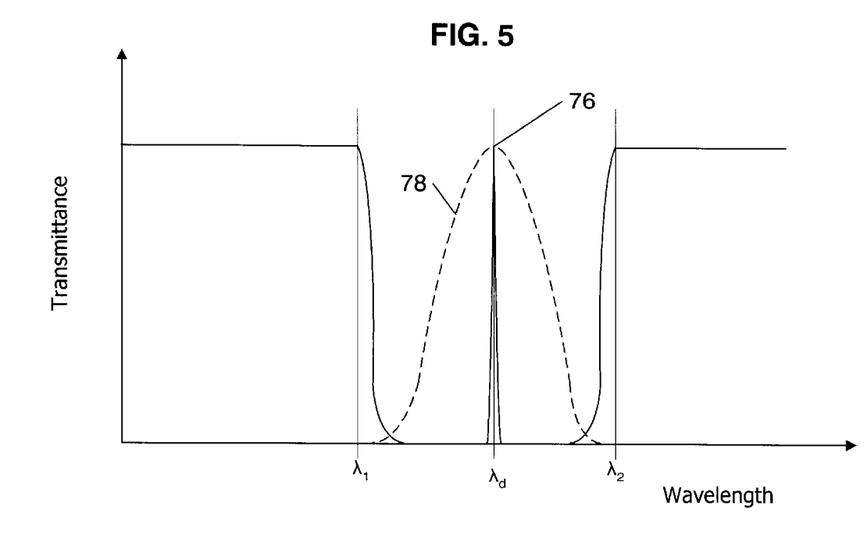
FIG. 5 is a diagram of transmittance versus wavelength, for the alternate embodiments of the inventive chiral fiber laser of FIGS. 2A–2C, showing the photonic band gap and the defect mode, as well as the emission spectrum of the active material used in the inventive chiral fiber laser.

Referring now to FIGS. 2A–2C, alternate embodiments of the fiber structure 12, having defects defined therein are shown as fiber structures 30, 40 and 50. Introduction of a defect into the fiber structure 12 produces a long-lived photonic defect mode in the center of the photonic stop band, as described in the above-incorporated commonly assigned U.S. Patents "Chiral Laser Apparatus and Method", and "Chiral Twist Laser and Filter Apparatus and Method". An exemplary defect mode 76 is shown in FIG. 5. The presence or lack of a defect in the fiber structure 12 is one of the factors that influence the value of the required pitch P.

Referring now to FIG. 2A, a fiber structure 30 is shown where a defect 36 is introduced by spacing apart two sequential longitudinally aligned structure portions 32 and 34 at a predetermined distance.

Referring now to FIG. 2B, a fiber structure 40 is shown where a defect 38 is introduced by spacing apart two sequential longitudinally aligned structure portions 32 and 34 at a predetermined distance and then introducing a dielectric material between the portions 32, 34.

Referring now to FIG. 2C, a fiber structure 50 is shown where a twist defect 42 is introduced by twisting one of the portions 32, 34 at a predetermined circumferential angle with respect to the other portion at a predefined twist angle θ. Preferably, the angle θ is 90 degrees, but it may be varied if a tunable chiral laser is desirable.

Figure 3A:
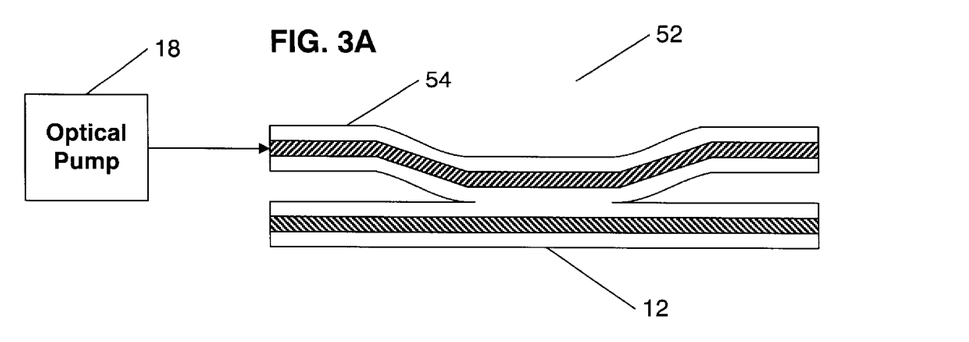
FIG. 3A is a schematic diagram of a side view of a second embodiment of the chiral fiber laser of the present invention where the inventive chiral fiber laser is pumped via a coupled optical fiber.
Figures 3B, 3C:
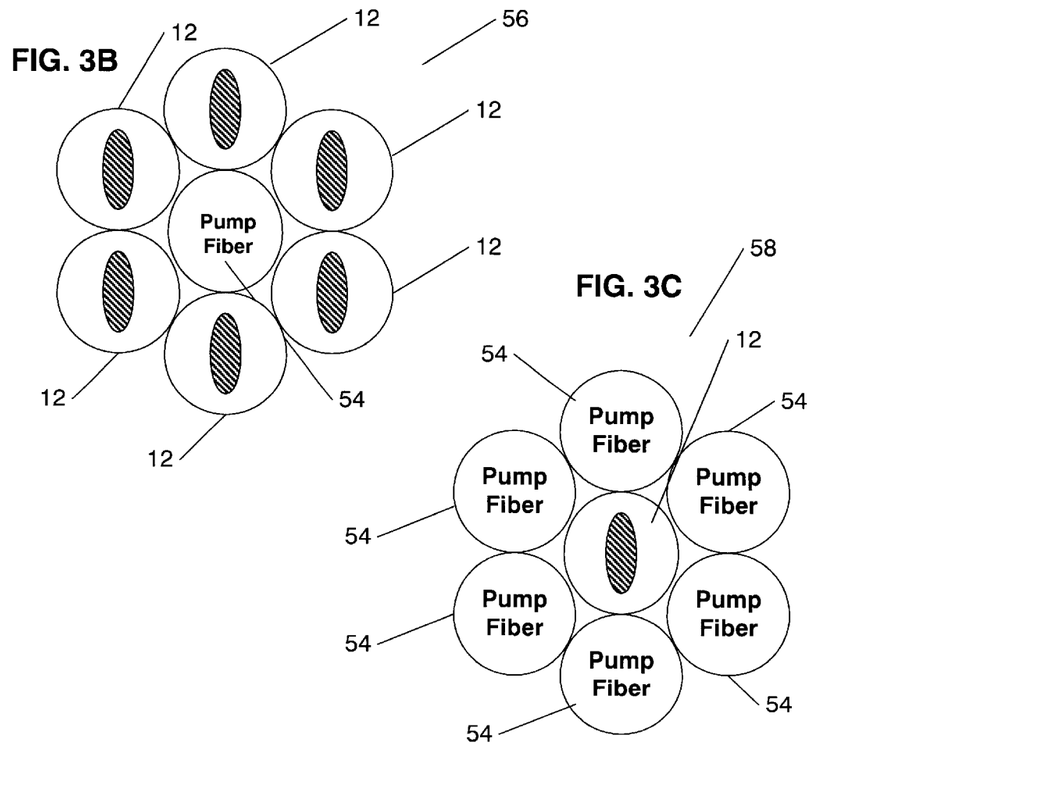
FIG. 3B is a schematic diagram of a cross section of a third embodiment of the chiral fiber laser of the present invention showing the inventive fiber laser pumped by multiple coupled optical pumping elements.
FIG. 3C is a schematic diagram of a cross section of a fourth embodiment of the chiral fiber laser of the present invention showing multiple inventive fiber lasers pumped by a single coupled optical pumping element.

A combination of one more defects described in FIGS. 3A–3C may be utilized as a matter of design choice without departing from the spirit of the present invention.

Referring now to FIG. 5, an exemplary transmittance vs. wavelength graph shows a simplified representation of the FBG of the fiber structure 12 showing a defect mode 76 corresponding to a wavelength $\lambda_d$, as well as the emission spectrum 78 having its emission peak substantially proximal to the defect mode 76. The example of FIG. 5 assumes that lasing is desired at wavelength $\lambda_L$ equal to $\lambda_d$. This near coincidence of the peak of the desirable defect mode 76 and of the emission peak of the emitting material produces optimized energy distribution within the fiber laser 10 and thus results in high efficiency lasing at the desired lasing wavelength $\lambda_L$. The fiber structure 50 of FIG. 2C is particularly advantageous because by changing the twist angle θ, the position of the defect mode 76, and thus the lasing wavelength $\lambda_L$ may be readily and dynamically changed, thus enabling the fiber laser 10 to be tuned.

Referring now to FIGS. 3A–3C, several alternate optical pumping embodiments for the chiral fiber laser 10 are shown. In FIG. 3A, a cross-section of a chiral fiber laser 52 is shown where optical pumping is delivered from the optical pump 18 via a optical fiber 54 coupled to the fiber structure 12. In FIG. 3B, a cross-section chiral fiber laser group 56 is shown where optical pumping is delivered from the optical pump 18 via a optical fiber 54 coupled to a plurality of fiber structures 12. Thus, a single pumped optical fiber is delivering coupled pumping to multiple chiral fiber lasers. In FIG. 3C, a cross-section of a chiral fiber laser 58 is shown where optical pumping is delivered from the optical pump 18 via a plurality of pumped optical fibers 54 coupled to a single fiber structure 12. Thus, a single fiber structure 12 is coupled to and pumped by multiple pumped optical fibers 54.

Figure 6:
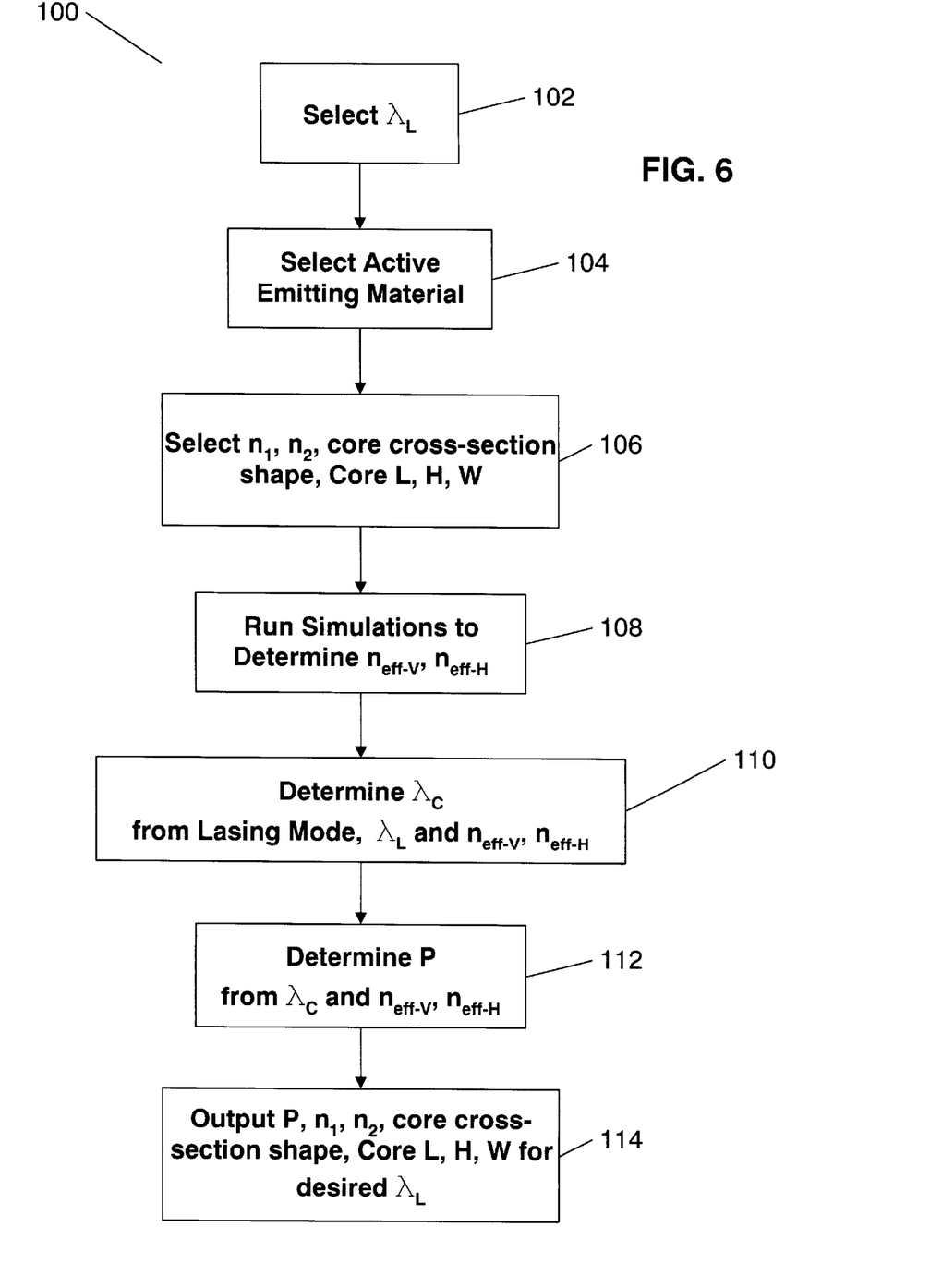
FIG. 6 is a flow diagram of an exemplary process for configuring the inventive chiral fiber lasers for lasing at a predefined desired wavelength.

Referring now to FIG. 6, an exemplary process 100 for configuring the fiber structure 12 for use with the chiral fiber laser 10 is shown. The process 100 may also be applied to other embodiments of the inventive chiral fiber laser 10 or components thereof, such as shown in FIGS. 2A–3C. The process 100 may be readily implemented as a software program to be executed by a typical computer system. Alternately, the process 100 may be manually performed, optionally utilizing software modeling for some of the steps. It should be noted that process 100 is shown by way of example only and is by no means the only method to configure the fiber structure 12. Other configuration techniques may be readily utilized without departing from the spirit of the invention.

The process 100 begins with a step 102 where the desired $\lambda_L$ is selected. At a step 102, an active emitting doping material (such as Erbium for example) for at least one of the core 14 and cladding 16 is selected.

At a step 106 specific materials for core 14 and cladding 16 are selected as a matter of design choice. As discussed above in connection with FIGS. 1A and 1B, the key to selection of the core and cladding materials is the value of the refractive indices of the core material ($n_1$) and the cladding material ($n_2$), and the difference between them.

At the step 106, the core 14 length L, as well as the core 14 cross section shape and vertical and horizontal dimensions, H and W, respectively, are also selected. The core 14 cross section shape may be elliptical, rectangular, or a combination of the two (parallel sides but semicircular top and bottom portions) or it may be any geometric shape with 180 degree symmetry. The magnitude of L, H and W are selected as a matter of design choice and depend on the desired size of the fiber laser 10 and well as on other factors (such as available materials).

At a step 106, simulations are performed using $\lambda_L$, $n_1$ and $n_2$, the core 14 cross section shape and L, H and W as input data to determine the effective vertical refractive index $n_{\mathit{eff}\text{-}V}$ and the effective horizontal refractive index $n_{\mathit{eff}\text{-}H}$ of a model of fiber structure 12 based on the input data (the effective refractive indices are shown in FIG. 1B). Such simulations can be performed using one or more well known optical simulation techniques such as FDTD (Finite Difference Time Domain), Beam Propagation method, microwave modeling, analytically by solving a transcendental equations for specific values of $\lambda_L$, $n_1$ and $n_2$, the core 14 cross section shape and L, H and W, or by trial iterative experimentation. An exemplary simulation platform that is advantageous for such calculations is the Simulant.Em™ software produced by Simulant, Inc, CA, US.

At a step 110, the desired lasing mode of the fiber laser 10 should be selected. The lasing mode could be at a band edge mode of the PBG (such as mode 70 of FIG. 4) or at a defect mode (such as mode 76 of FIG. 5), if a defect 36, 38 or 42 is introduced into the fiber laser 10 (see FIGS. 2A–2C). An advantageous defect for use in the inventive chiral fiber laser 10 is a twist defect 42 shown in FIG. 2C. Once the desired lasing mode is selected, the value of $\lambda_C$, a wavelength at the center of the PBG of the fiber structure 12 (as shown in FIG. 4), is determined from $\lambda_L$, $n_{\mathit{eff}\text{-}V}$, and $n_{\mathit{eff}\text{-}H}$, based on the selected lasing mode. The value of $\lambda_C$ can be calculated using a number of well-known mathematical expressions. An exemplary expression for determining $\lambda_C$ that may be readily utilized when lasing is desirable at a band edge mode or at a defect mode that is based on a twist defect 42, is shown below:

$$\lambda_C = \lambda_L/(1+(\Delta n_{\mathit{eff}}/n_{\mathit{eff}\text{-}AV})*(0.5-\theta/180))$$

Where:

$\Delta n_{\mathit{eff}} = n_{\mathit{eff}\text{-}V} - n_{\mathit{eff}\text{-}H}$;

$n_{\mathit{eff}\text{-}AV} = (n_{\mathit{eff}\text{-}V} - n_{\mathit{eff}\text{-}H})/2$; and θ=twist angle of the twist defect 42, where when θ=0 or 180 degrees if lasing is desired at a band edge mode, otherwise lasing will occur at a defect mode.

At a step 112, the pitch P to be applied to the fiber structure 12 is determined from the values of $\lambda_C$ and $n_{\mathit{eff}\text{-}AV}$. P may be determined using the following expression:

$$P = \lambda_C/n_{\mathit{eff}\text{-}AV}$$

The value of P is directly proportional to the value of $\lambda_L$. Thus, if, for example, the value of $\lambda_L$ needs to be adjusted by 10% after the steps 106–114, the value P can simply be adjusted by 10% to ensure that the fiber laser 10 will provide lasing at the new value of $\lambda_L$.

At a step 114, the values of P, $n_1$, $n_2$, the core 14 cross section shape, L, H, and W are provided as configuration parameters for fabricating a fiber structure 12, that when used in the fiber laser 10 will enable the fiber laser 10 to produce lasing at the desired wavelength $\lambda_L$.

It should be noted that the process 100 above is shown in a simplified form. In actual use, if desired, the above steps 108–112 may be modified to account for material and waveguide dispersion. This is because due to material dispersion, $n_1$, $n_2$ are slightly different for different values of $\lambda_L$. And similarly, due to waveguide dispersion, the values of $n_{\textit{eff-V}}$ and $n_{\textit{eff-H}}$ also depend on the specific value of $\lambda_L$. Of course any commercial software implementation of steps 108–112 will include compensation for material and waveguide dispersion.

In conclusion, it should also be noted that the chiral fiber laser 10 may be utilized at below the lasing threshold. Thus instead of being used as a laser, the chiral laser 10 may be utilized as a light source with a high extraction efficiency.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A chiral fiber laser comprising:
   an elongated chiral optical fiber comprising a photonic stop band with a plurality of long-lived photonic modes occurring therein, said chiral optical fiber having a central longitudinal axis, a core disposed along said longitudinal axis, said core having a pitch, a core cross-section shape, a core length, a core height, a core width, and a core refractive index, and a cladding surrounding said core having a cladding refractive index:
   active dopant disposed throughout at least one of said core and the cladding, wherein said core and cladding refractive indices, said core cross-section shape, said core length, said core height, said core width, and said pitch are configured to produce a particular long-lived photonic mode, from said plural long-lived photonic modes, corresponding to a desired lasing wavelength, and
   excitation means, applied to said elongated chiral optical fiber, for causing said chiral optical fiber to emit electromagnetic radiation, wherein said active dopant is configured to produce peak gain substantially positioned at said selected particular long-lived photonic mode, such that lasing output occurs at said desired lasing wavelength with at least one of: a maximum output power and a minimized lasing threshold.

2. The chiral fiber laser of claim 1, wherein said chiral optical fiber comprises a structure having a period that is one half of a wavelength of a signal inside said chiral optical fiber, and said pitch which is twice said period.

3. The chiral fiber laser of claim 1, further comprising: first tuning means for dynamically tuning said desired lasing wavelength by changing said pitch of said chiral optical fiber.

4. The chiral fiber laser of claim 3, wherein said first tuning means comprise at least one of: twisting said chiral optical fiber along said longitudinal axis, and heating, cooling, stretching or shrinking said chiral optical fiber.

5. The chiral fiber laser of claim 1, further comprising a defect disposed in said chiral optical fiber causing a long-lived defect photonic mode in said photonic stop band of said chiral optical fiber.

6. The chiral fiber laser of claim 5, wherein said core and cladding refractive indices, said core cross-section shape, said core height, said core width, and said pitch are configured such that said desired lasing wavelength corresponds to said long-lived defect photonic mode and wherein said active dopant is configured to produce peak gain substantially positioned at said long-lived defect photonic mode, such that the lasing output occurs at said desired lasing wavelength with at least one of: a maximum output power and a minimum lasing threshold.

7. The chiral fiber laser of claim 6, wherein said chiral optical fiber comprises two sequential longitudinal portions, and wherein said defect comprises at least one of: a predetermined spacing between said two longitudinal portions, a dielectric material positioned between said two longitudinal portions, and a circumferential twist at a predetermined twist angle between said two longitudinal portions.

8. The chiral fiber laser of claim 7, further comprising second tuning means for dynamically tuning said second lasing wavelength by at least one of: changing said predetermined spacing between said longitudinal portions of the chiral optical fiber, and changing said predetermined twist angle.

9. The chiral laser of claim 1, wherein said excitation means comprises a direct optical pump source configured to provide optical pumping along said longitudinal axis of said chiral optical fiber through at least one of: said core and said cladding.

10. The chiral laser of claim 1, wherein said excitation means comprises a coupled fiber optical pump source configured to deliver optical pumping by proximity to said chiral optical fiber.

11. The chiral laser of claim 1, wherein said excitation means comprises a plurality of coupled fiber optical pump sources configured to deliver optical pumping by proximity to said chiral optical fiber.

12. The chiral laser of claim 1, wherein increasing a difference between said core refractive index and said cladding refractive index corresponds to optimization of the chiral fiber laser for low threshold lasing, and wherein, decreasing said difference between said core refractive index and said cladding refractive index corresponds to optimization of the chiral fiber laser for high power lasing.

13. An apparatus for customizing a chiral fiber laser for lasing and at desired lasing wavelength, comprising:
   means for selecting:
   (1) an optical fiber core having cross-section shape with 180 degree symmetry, a core length, a core height, a core width, and a core refractive index, and,
   (2) a cladding for surrounding said core, having a cladding refractive index, wherein active dopant is disposed throughout at least one of said core and the cladding,
   means for determining a value of a desired pitch to be applied to said core given said desired lasing wavelength, said core cross-section shape, said core length, core height and core width, a core refractive index, and a cladding refractive index, such that when said core is twisted at said desired pitch, a resulting chiral optical fiber will be configured to comprise a photonic stop band with a plurality of long-lived photonic modes occurring therein, wherein a selected long-lived photonic mode of said plural long-lived photonic modes corresponds to said desired lasing wavelength;

means for applying said desired pitch to said core to produce said chiral optical fiber; and excitation means, applied to said chiral optical fiber, for causing said chiral optical fiber to emit electromagnetic radiation, wherein said active dopant is configured to produce peak gain substantially positioned at said selected long-lived photonic mode, such that lasing output occurs at said desired lasing wavelength with at least one of: a maximum output power and a minimized lasing threshold.

14. A method for lasing utilizing a chiral fiber structure comprising the steps of:

(a) providing an elongated chiral optical fiber comprising a photonic stop band with a plurality of long-lived photonic modes occurring therein, said chiral optical fiber having a central longitudinal axis, a core disposed along said longitudinal axis, said core having a pitch, a core cross-section shape with 180 degree symmetry, a core length, a core height, a core width, and a core refractive index, and a cladding surrounding said core having a cladding refractive index, (b) prior to said step (a), choosing said core and cladding refractive indices, said core cross-section shape, said core length, said core height, and said core width;

(c) after said step (b) but prior to said step (a), determining a desired pitch that corresponds to a desired lasing wavelength, from:
i) said desired lasing wavelength,
ii) said core and cladding refractive indices, and
iii) said core cross-section shape, said core length, said core height, and said core width;

(d) prior to said step (a) configuring said elongated chiral optical fiber with said desired pitch such that said desired lasing wavelength corresponds to a particular long-lived photonic mode from said plural long-lived photonic modes, (e) prior to said step (a), choosing and configuring an active dopant disposed within at least one of said core and said cladding, to produce peak gain approximately positioned at said selected particular long-lived photonic mode; and (f) applying excitation to said chiral optical fiber, to cause said chiral optical fiber to emit electromagnetic radiation, such that lasing output occurs at said desired lasing wavelength with at least one of: a maximum output power and a minimized lasing threshold.

15. The method of lasing of claim 14, further comprising the step of:

(g) prior to said step (a) introducing a defect into said chiral fiber structure such that said selected particular long lived photonic mode is a defect mode.

16. The method of lasing of claim 15, wherein said chiral fiber structure comprises two sequentially positioned longitudinal portions, and wherein said defect introduced at said step (g) comprises a circumferential twist at a predetermined twist angle between said two longitudinal portions, further comprising the step of:

(h) dynamically tuning said desired lasing wavelength by changing said predetermined twist angle.

17. The method of lasing of claim 14, further comprising the step of:

(i) dynamically tuning said desired lasing wavelength by changing said desired pitch of said chiral optical fiber.

* * * * *